No. 767,108. PATENTED AUG. 9, 1904.
J. R. GALLAGHER.
LOCKING DEVICE FOR HAT FASTENERS.
APPLICATION FILED MAR. 4, 1904.
NO MODEL.

*Fig.2*    *Fig.3*    *Fig.4*

Witnesses:
Sadie Bennett.
Ernett F. Wright

Inventor:
James R. Gallagher,
by Andrew Fowler Jr.
Atty.

No. 767,108. Patented August 9, 1904.

UNITED STATES PATENT OFFICE.

JAMES R. GALLAGHER, OF BUENA VISTA, NEW JERSEY.

LOCKING DEVICE FOR HAT-FASTENERS.

SPECIFICATION forming part of Letters Patent No. 767,108, dated August 9, 1904.

Application filed March 4, 1904. Serial No. 196,582. (No model.)

*To all whom it may concern:*

Be it known that I, JAMES R. GALLAGHER, a citizen of the United States, and a resident of Buena Vista, in the county of Hudson and State of New Jersey, have invented certain new and useful Improvements in Means for Locking the Pins of Hat-Fasteners, of which the following is a specification.

My invention relates to improvements in means for locking the pin of a hat-fastener; and the object of my invention is to provide means for locking in position pins or bolts by means of a frictional clutch.

This device is adapted for varied uses, but is especially designed for securing the pin of a hat-fastener in position after the same has been passed through the body of the hat and to prevent the pin from working loose. I attain this object by the mechanism illustrated in the accompanying drawings, in which—

Figure 1:
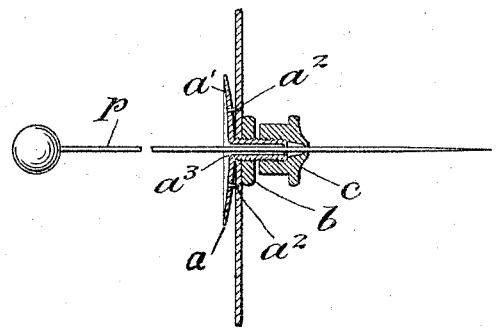
Figure 1:
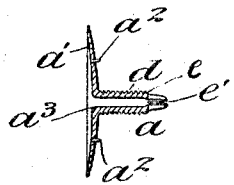
Figure 1:
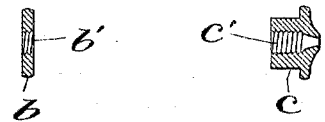
Figure 1:
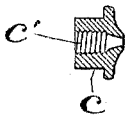

Figure 1 is a sectional view of my device complete. Fig. 2 is a view of the socket member. Fig. 3 is a view of the retaining-nut. Fig. 4 is a view of the clutch-nut.

Similar letters refer to similar parts throughout the several views.

A socket member $a$, slightly concave on its outer face $a'$, having a projecting section $e$ longitudinally perforated and split at its outer end $e'$ and provided with exterior screw-threads $d$ intermediate of the split end and the base, is formed upon the opposite side of the socket member. The outer split end of the projecting section $e$ is smooth and tapered to enter the clutch-nut $c$. An interiorly-screw-threaded nut $b$ is provided to fit upon the thread $d$. A clutch-nut $c$, with a longitudinal perforation $c'$, provided with interior screw-threads, having the opening at one side larger than the opening at the other side, is provided to fit upon the projecting section $e$. The outer end of the longitudinal perforation of the projecting section $e$ being smaller than the inner end, the split end $e'$ of the projecting section $e$ of the socket member $a$ will be closed by screwing the nut $c$ upon the split end $e'$ of the socket member. I also provide small points or lugs $a^2$ $a^2$ upon the inner face of the socket member $a$ beneath the screw-nut $b$ to hold the device in position.

The action of my device is as follows: The socket member $a$ is inserted in the article to which it is desired to attach the pin. The screw-nut $b$ is then fitted over the projecting end $e$ of the socket member $a$ and is screwed down upon the threads $d$ until the socket member $a$ is securely attached. A pin or bolt is then inserted in the longitudinal perforation $a^3$ in the socket member $a$ to the point where it is desired to lock it, and the clutch-nut $c$ is placed over the projecting end $e$ of the socket member $a$ and screwed upon the thread $d$ until the split end $e'$ of the socket member $e$ securely grips the pin $p$, when it will be found that the pin $p$ will be securely locked against withdrawal. When it is desired to release the pin $p$, a turn of the nut $c$ will permit the spring action of the end $e'$ of the socket member $e$ to open, and thus release the pin $p$. The parts need not then be taken apart or separated, but may remain in position, and whenever it is desired to lock the pin $p$ it may be inserted as before and gripped by the screw action of the nut $c$.

Having thus described my invention, what I claim is—

A device of the character described comprising a socket member provided with a slightly-concave base, an integral, hollow section having external screw-threads formed on the base, a plain, reduced split end portion forming a tapering projection on said section, a securing-nut carried on the screw-threaded portion of the section, and a nut provided with an enlarged opening having screw-threads therein adapted to receive the threaded portion of the hollow section, and having a reduced tapered opening within which seats the tapered end portion of the said section, substantially as set forth.

Signed at New York city, in the county of New York and State of New York, this 18th day of February, A. D. 1904.

JAMES R. GALLAGHER.

Witnesses:
GROSVENOR H. BACKUS,
HARRY G. KOSCH.